March 5, 1929.    J. DEGERTH    1,704,658
SEPARATOR
Filed April 30, 1927

INVENTOR
JOHN DEGERTH
BY
ATTORNEY

Patented Mar. 5, 1929.

1,704,658

UNITED STATES PATENT OFFICE.

JOHN DEGERTH, OF HELSINGFORS, FINLAND, ASSIGNOR TO MASKIN-OCH BROBYG-GNADS AKTIEBOLAGET, OF HELSINGFORS, FINLAND.

SEPARATOR.

Application filed April 30, 1927, Serial No. 188,019, and in Germany May 29, 1926.

In cream separators it is usual to have a milk tank mounted on a bracket on one side of the separator and the faucet regulating the milk flow arranged in the center of a supply funnel containing a float. It is necessary to place the milk tank so that the faucet always comes in the center of the supply funnel, but at the same time the bottom of the faucet must be below the edge of the supply funnel in order to avoid splashing. When removing or turning the milk tank it must therefore be lifted in order to go free of the edge.

The invention is illustrated in the drawing, of which:

Figure 1:
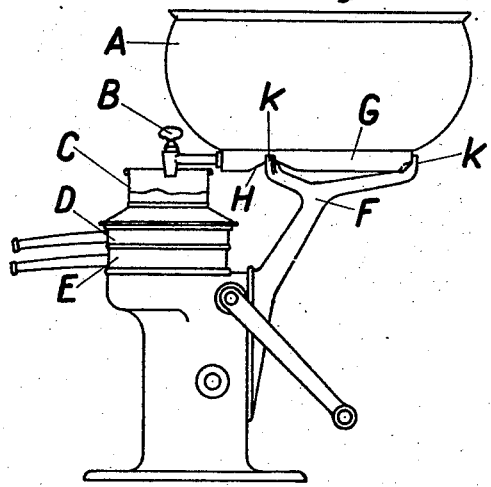
Figure 1 is an elevation of a cream separator embodying the improvement.
Figure 2:
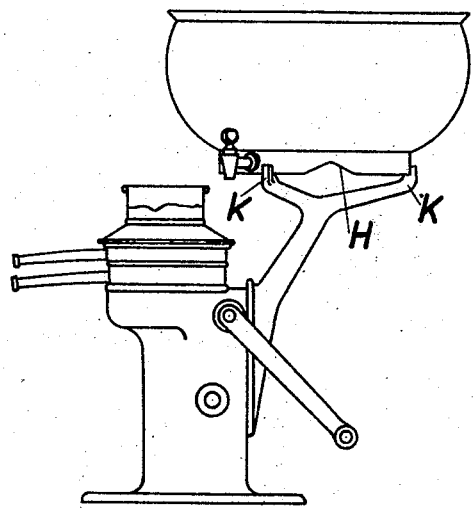
Figure 2 is a similar view showing the milk tank elevated.

In the drawing, A is the milk tank, B the faucet, C the supply funnel, D and E the cream and skim milk trays, F the support for the milk tank which rests on three or more branches K. G is the bottom ring of the milk tank and in this bottom ring are arranged notches H which fit in the branches K. The notches are shaped so that when the milk tank is turned to one side it will raise and allow the faucet to go free of the edge of the supply funnel C as shown in Fig. 2. The movement is very simple and most convenient.

Claim:

In a separator, a tank provided with a faucet and a bottom rim having notches, and a support for the tank normally engaging the notches of the tank, the tank being adapted to be turned to disengage the notches from the support and thereby raise the tank.

JOHN DEGERTH.